Nov. 17, 1942.  H. P. HAGGART  2,302,314

AUTOMATIC POULTRY FEEDING APPARATUS

Filed Oct. 7, 1940  3 Sheets-Sheet 1

INVENTOR

Harold Park Haggart

INVENTOR
Harold Park Haggart

Patented Nov. 17, 1942

2,302,314

UNITED STATES PATENT OFFICE 2,302,314

AUTOMATIC POULTRY FEEDING APPARATUS

Harold Park Haggart, Oregon City, Oreg.

Application October 7, 1940, Serial No. 360,083

7 Claims. (Cl. 119—51)

My invention relates to improvements in automatic poultry feeding apparatus in which feed is supplied, distributed and proportioned out or measured to fowls or other animals confined in compartments, batteries or cages. This application is a continuation in part of application No. 204,089, filed April 25, 1938.

My present invention contemplates the provision of a conduit for conducting feed downward from a large stored supply in the upper structure of a building, through one or more rooms below in which are located poultry batteries or laying cages. It is an important object of this invention to provide facilities for making said feed in said conduit available for distribution, through side openings in said conduit, to a plurality of feeding troughs on each poultry battery, one of said openings to each of said feeding troughs, the feeding troughs being arranged in series one below the other. The mechanical structure which renders feed contained in said vertically arranged conduit available to storied feed troughs I will call the multi-ingress. A further important object of this invention is to provide a conveyor belt in each of said feeding troughs and to operate all of said conveyor belts in a vertical series of feeding troughs simultaneously, all belts being actuated in a common direction when distributing feed throughout the troughs, said belts drawing feed from said multi-ingress, each belt moving beneath one chute positioned at each of said openings. Also means are provided in said multi-ingress for receiving feed discharged from said belts when the direction of motion of the belts is reversed in their troughs toward the ingress. Feed thus redeposited back into the multi-ingress may then be redrawn out into said feeding troughs upon the next succeeding conveyor below, if any. Said multi-ingress is designed to be rigidly held adjacent to an end of said feeding troughs. Supported within the multi-ingress housing are conveyor belt wheels or belt drums, one adjacent to an end of each feeding trough. Means for gauging and controlling the depth or quantity of feed as issued from said multi-ingress are affixed to its structure. When poultry feed, contained in the multi-ingress assembly is being drawn out into a series of feeding troughs, those troughs situated on succeeding decks farther down in the series receive a constant supply, undiminished by the draft made on said feed in the supply conduit by conveyor apparatus in troughs above because of the comparatively slow motion of conveyor belts. A major advantage is therefore made possible by my invention as the ribbons of feed issuing from the gauges positioned at each ingress in said multi-ingress may be drawn simultaneously in the same direction along the battery front on conveyors in all feed troughs on the battery which makes it possible to supply feed to all animals in said battery in less than one minute. Also remnants of feed left by the animals at the end of a feeding period may be returned to the ingress for redistribution.

It is a further important object of this invention to provide a feed distribution system for poultry batteries in which the conveyor belt wheels or drums, positioned on the opposite end of said feeding troughs from that occupied by said multi-ingress, are housed in a structure which may be termed the multi-egress. Each belt drum in said multi-egress is rotated by a gear positioned on the outside wall of the egress housing, and all of said gears are actuated by one drive shaft affixed vertically to the outside wall of the egress. Said multi-egress being affixed to an end of all of said feed troughs in a vertical series may serve as a discharge conduit for directing feed cascaded from the troughs downward to a concentration point. Adjustable belt tightening means are affixed to the multi-egress housing and said vertically arranged drive shaft is rotated through gears by a main line shaft positioned horizontally above the multi-egress. Thus when automatic poultry feeding apparatus such as above described is affixed to a number of batteries, and actuated by said horizontally arranged main line shaft, rotated by a motor through suitable back gears, thousands of hens may be fed in less than one minute at very slight cost of operation.

This invention (in preferred form), is illustrated in the drawings and hereinafter more fully described.

In the drawings:

Figure 1 represents a side view of an automatic poultry feeding apparatus embodying the principles of my invention. Short dotted lines show the relative position of interior parts with driving gears and belt tightening adjustments on the exterior removed.

Fig. 2 is a partial sectional view taken substantially on the line II—II of Fig. 1. Cross sectional views of feed troughs show beading removed. This figure illustrates the multi-egress assembly with driving gears and belt drums omitted.

Figure 3 is a partial sectional view taken substantially on the line III—III of Fig. 1. Beading is shown omitted on cross sections of feeding troughs. This figure illustrates an exterior view of the multi-ingress assembly.

Fig. 4 is a sectional longitudinal drawing showing relative position of interior parts and illustrates movement of feed through the mechanism, the feed being represented by dots. In this figure the conveyor on the top deck is shown discharging feed back into the multi-ingress with valves closed. The conveyor on the middle deck is shown drawing feed from the open ingress valves into a feed trough. The conveyor on the bottom deck is shown discharging into the multi-egress with ingress valves closed. It is understood that some conveyors can not be operated in a different direction from other conveyors at the same time. To avoid drawing three separate drawings of the machine each showing three decks with conveyors, one drawing to show all belts discharging surplus feed left from the previous feeding back into the ingress as shown on the top deck in Fig. 4, another drawing to show all belts drawing feed into the troughs as shown on the middle deck of Fig. 4 and still another drawing showing all decks discharging feed as shown in the bottom deck of Fig. 4. Fig. 4 has been drawn to combine said three separate drawings into one figure.

Figure 1:
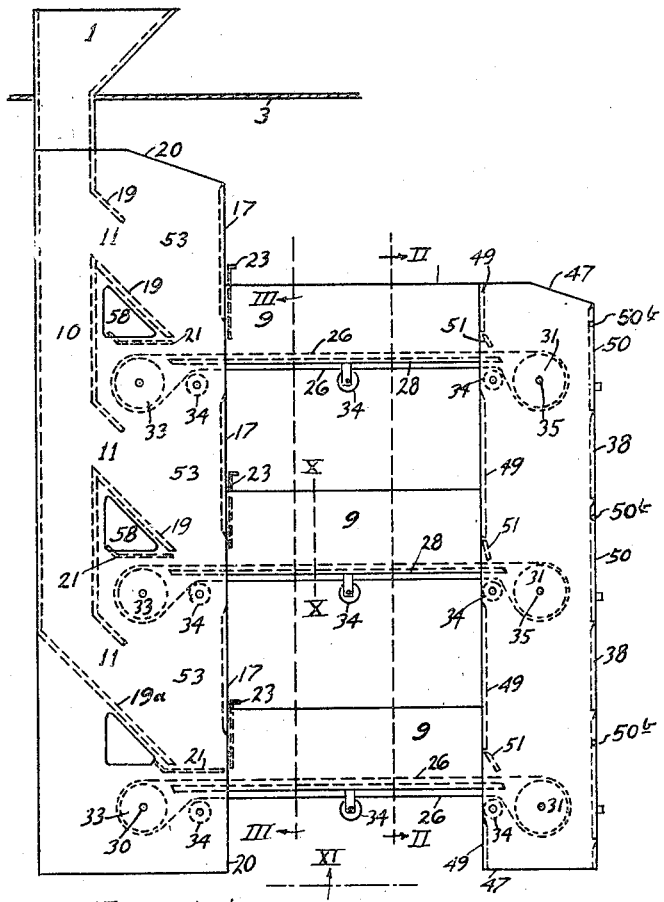
Figure 11:
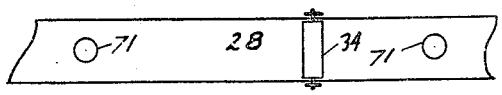
Figure 4:
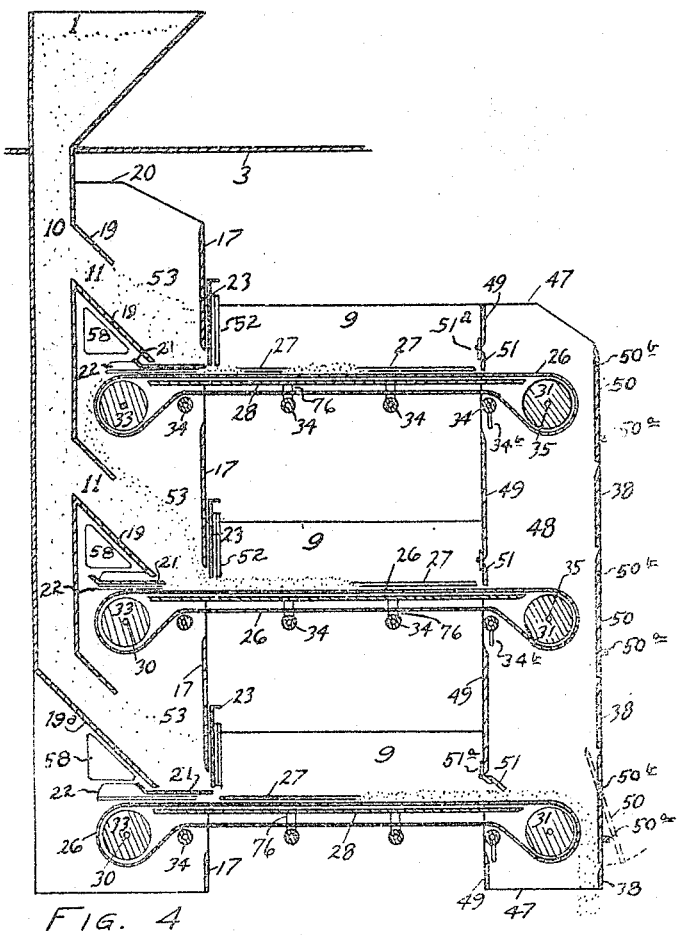
Figure 10:
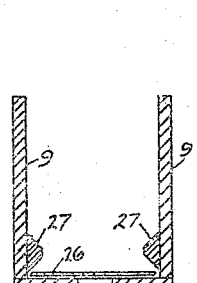
Fig. 10 is an enlarged sectional view of a feeding trough taken substantially on the line X—X of Fig. 1. The belt is shown omitted beneath this figure.
Figure 9:
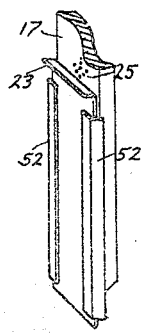
Fig. 9 is a perspective elevation of an adjustable vertical slide on the multi-ingress, further illustrating the slide supporting members.
Figure 8:
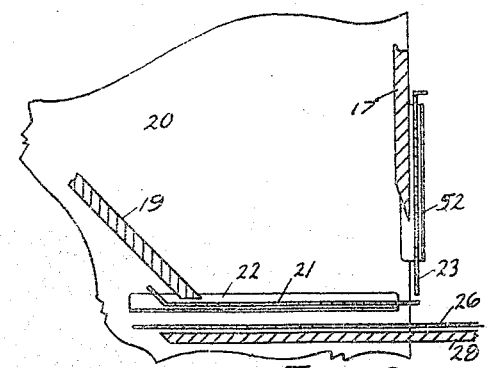
Fig. 8 is an enlarged partial sectional view taken substantially on the line VIII—VIII of Fig. 3 showing valve slides and slide supporting members.

Fig. 11 is a partial view of the bottom of a feeding trough as viewed from the line XI in Fig. 1 omitting the end portions of the trough which are shown broken off and illustrating the holes through the trough bottom and showing one only of the belt supporting idlers. As best shown in Figs. 1, 3 and 4, the reference numeral 20 indicates the exterior housing or the framework of the multi-ingress assembly. 58 represents an opening in 20 to serve as a hand hole admitting adjustments to be made to foot valve 21 when necessary. Reference numeral 47 in Figs. 1, 2 and 4, indicates the housing walls or frame of the multi-egress assembly and between the egress and ingress assemblies and rigidly attached thereto are feeding troughs 9. As shown in Figs. 1 and 4 a large feed bunker 1 positioned above the multi-ingress supplies feed to the internal channels of the multi-ingress through conduit 10. Openings 11 in the side wall of conduit 10 permit feed to pass or cascade from the supply conduit to compartments 53. Compartment 53 is formed by the two side walls 20, chute 19 beneath opening 11 and by the cross member 17 also by slides 21 and 23 which constitute a portion of compartment 53 when closed. The cross members 19 both above and below opening 11 conduct feed downward at an angle toward the bottom of compartment 53. Cross member 19 below 11 also prevents feed from engulfing the conveyor belt wheel immediately beneath 19. When slide 21 is opened, feed contained in cell 53 drops upon conveyor belt 26 which belt in moving along the bottom 28 of trough 9 conveys the feed throughout the length of the trough. Endless belt 26 is turned about conveyor belt drums 33 and 31, passing beneath trough bottom 28 over idler rollers 34. A bead 27 attached, one to each side wall of trough 9, having a triangular cross section as shown in Fig. 10, tends to retain the edges of belt 26 in place, tends to prevent the fowls picking at and lifting the belt margin and also due to its triangular cross section tends to eject coarse feed particles from the belt margins. Holes 71 spaced at intervals along the bottom 28 of feeding troughs, piercing the thickness of 28, permit feed particles, if any, that gather under the belt to pass through to the next trough below, if any. When foot valve or slide 21 is moved under the bottom opening in compartment 53, feed contained in said compartment is suspended above conveyor belt 26 which prevents the feed in the cell from being drawn out and discharged below when the conveyor belt 26, resting on 28, is moved in the direction of the multi-ingress. Slide 21 is spaced with sufficient clearance above belt 26 to permit rejected or surplus feed in trough 9 to be conveyed beneath slide 21 and discharged into the next compartment 53 below, if any. The vertical valve or slide 23 is adjustable in grooves 52 to control the desired amount of feed drawn out of compartment 53. Slide 23 is adjustable to a scale 25 on panel 17 to accurately measure the depth of the ribbon of feed drawn into trough 9. 51 represents a door, hinged to panel 49 on egress housing 47. Door 51 tends to prevent fowls from flipping feed into the egress while eating but is readily opened by the pressure of feed when conveyor 26 is discharging into the multi-egress conduit as shown on the bottom deck of Fig. 4.

Figure 2:
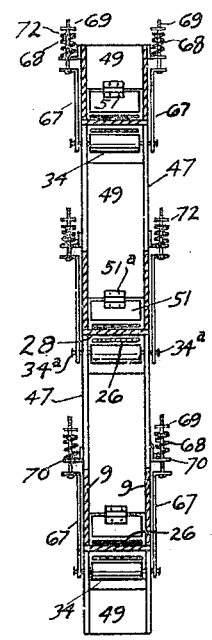
Figure 3:
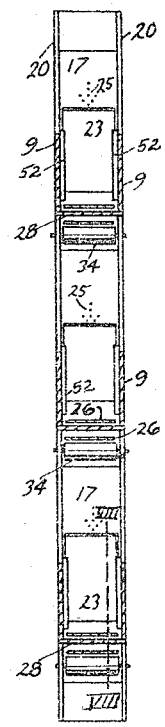
Figure 5:
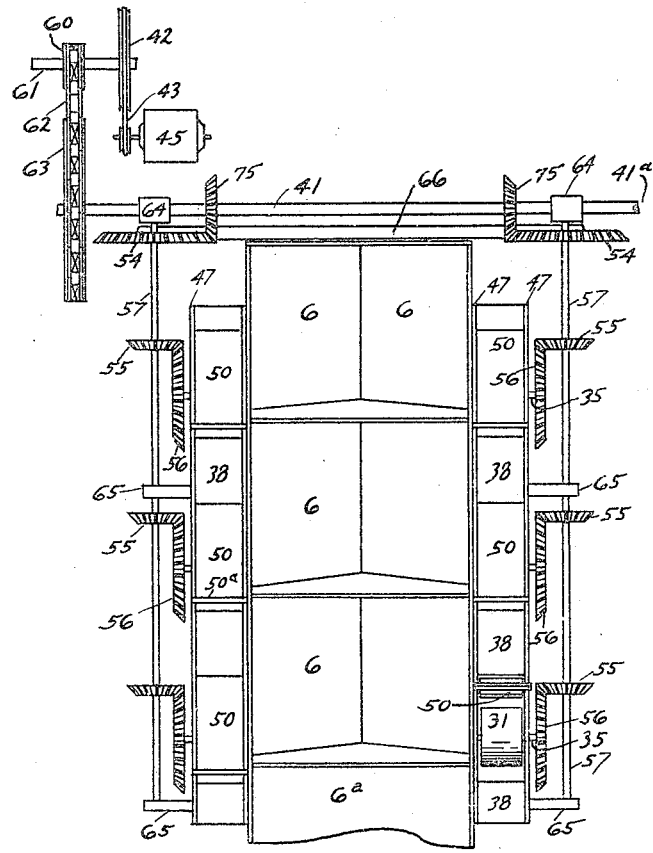
Fig. 5 is an end elevational view of a battery showing multi-egress assemblies, as viewed from the right of Fig. 1, attached to the battery with gears, drive shafting and driving means illustrated and with belt tightening mechanism removed.

In Fig. 2, the reference numeral 34a represents the hub or axle pin of idler roller 34 which roller is positioned inside the egress housing adjacent to belt drum 31. 67 represents a flat strip of metal shaped to form an inverted L the bottom end of which is made to receive the hub of axle pin 34a, permitting the pin to rotate freely. 70 also represents a flat strip of metal shaped to form an L which is fastened rigidly to the exterior wall 47 of the egress housing, as a bracket. Bolt 69 fastened to 67 passes freely through a hole in bracket 70. Helical compression spring 68 loosely surrounds bolt 69 and rests upon bracket 70 in such a manner that when the nut 72 is adjusted on 69 compression roller 34 is moved up or down as desired in effecting the tension on belt 26. Axle pin 34a is carried in a vertically elongated hole in panel 47 admitting 34a to freely move up or down as belt tension is being adjusted. Two belt tightening devices as above described are required for each roller 34 in the multi-egress, one positioned on either side of the housing on the exterior wall. The belt drum axle 35 extends through bearings in the walls 47 of the multi-egress housing, one bearing on each side to each belt drum 31. Gear 56 is attached to one hub of axle 35 and positioned adjacent to the exterior of housing 47. Gears 55 affixed to vertically positioned shafting 57, one gear 55 meshing with one gear 56, rotate the belt drums 31 and thus put in motion conveyor belts 26. The shaft 57 is carried in bearings 65 attached to housing 47 and also is rotatably received in a vertical bearing in 64. Shaft 57 is rotated by a gear 54, keyed to the shaft. Gear 54 is in turn driven by gear 75 keyed to line shaft 41 which shaft rotates in bearings carried horizontally through 64. Bearing housing 64 is affixed to beam 66 which is in turn rigidly attached to the top framework of battery 6a and positioned above the multi-egress housing. Line shaft 41 shown broken at 41a is positioned horizontally to extend more or less throughout the length or breadth of a room containing a plurality of batteries, each battery similarly equipped with driving means as shown in Fig. 5. It is my intention that said line shaft 41 when extended beyond the point 41a will transmit a motivating force to my automatic feeding mechanism attached to each of said plurality of batteries.

Figure 6:
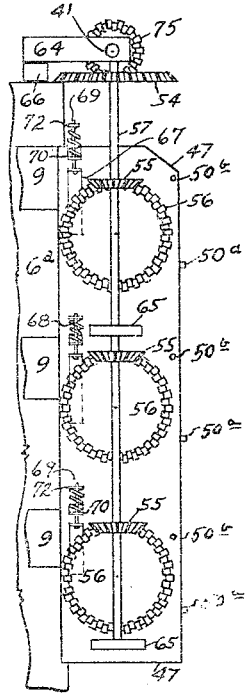
Fig. 6 is a side elevation of the multi-egress comparable to the right-hand portion of Figure 1 but showing driving gears and drive shafting in position.
Figure 7:
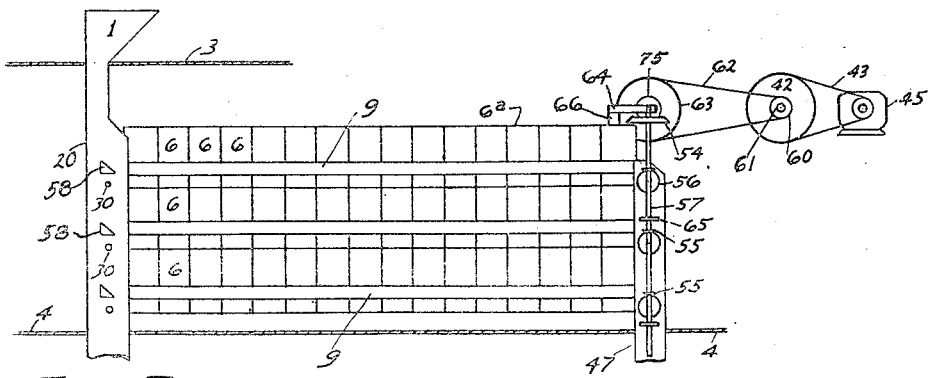
Fig. 7 is a simplified diagrammatic view in elevation showing a poultry battery with my automatic poultry feeding mechanism attached, omitting the multi-ingress hand holes and also omitting belt tightening adjustment mechanism and belt supporting idlers.

Sprocket wheel 63, keyed to line shaft 41 is rotated by sprocket chain 62 which is driven by sprocket 60 attached to shaft 61. Belt wheel 42 attached to shaft 61 is rotated by belt 43 driven by motor 45. Battery framework 6a Figs. 5 and 6 and battery cells 6 Figs. 5 and 7 are shown to illustrate the relation of my invention thereto.

It is my intention that bunker 1 be preferably placed in or upon the floor 3 above the multi-ingress but said bunker may be positioned above said ingress without reference to floor or ceiling 3. It is further intended that the multi-ingress 20 and multi-egress 47 as shown diagrammatically in Fig. 7 may be extended downward through floor 4 to one or more floors below where said ingress 20 and egress 47 may be attached to and made a part of automatic feeding mechanism identical with the machine as herein described and illustrated in the drawings. Reference numerals 38 indicate part of the framework of the egress housing, 38 being rigidly attached to 47 in the same manner as 49. Reference numerals 50 indicate a portion of the multi-egress housing which portion is movable as a door to admit access to the interior of the housing for servicing. A hand hold 50a shown in Figs. 5 and 6 serves as a handle for moving the door outward as illustrated by dotted lines at the bottom of Fig. 4.

It will be understood that while the invention has been specifically described and illustrated in connection with a battery laying cage, it is of wider application for the general distribution and conveying of feed materials and the like in multi-storied animal houses and elsewhere.

I am aware that many changes may be made and numerous details of construction may be varied through a wide range without departing from the principles of this invention, and I, therefore do not propose limiting the patent granted hereon otherwise than as necessitated by the prior art.

I claim as my invention:

1. A feed distributing mechanism comprising a vertical conduit having a plurality of chutes positioned one above the other and extending from one wall of said vertical conduit, each of said chutes terminating in a chamber having for its bottom an adjustable slide and having a vertically arranged adjustable slide across one vertical side, said vertically arranged slide being also positioned across the open end of a poultry feeding trough, scales to which said vertical slides may be set, one scale for each slide, means for housing a plurality of conveyor belt drums, a drum being positioned below each of said chambers adjacent to the end of a poultry feeding trough and positioned within a niche in said housing means, the walls of said niche serving the purpose of preventing feed contained in said vertical conduit and in said chutes from engulfing said conveyor belt drums, a plurality of said poultry feeding troughs, positioned one above the other with the end of each trough positioned adjacent to one of said chambers, said poultry feeding troughs being adapted to extend along the side of a poultry battery, a conveyor belt positioned in each of said feeding troughs, each of said troughs having recesses formed on the two side walls near the bottom, one recess to each side wall, which recesses extend throughout the length of said poultry feeding troughs and each of said recesses forming an elongated receptacle admitting the free running edge of a conveyor belt and serving the purpose of guiding and holding down the edge of said conveyor belt, each of said poultry feeding troughs terminating at its opposite end from that near said chamber, adjacent to and opening into a feed discharge conduit, a feed discharge conduit which houses a plurality of conveyor belt drums, each drum being positioned adjacent to the end of one of said feeding troughs, bearings for supporting said belt drums, two bearings for each drum, affixed one each to said discharge conduit walls, means also positioned on said discharge conduit, for causing tension on said conveyor belts, and means including gears, drive shafts and a motor for rotating such of said belt drums as are positioned within the discharge conduit.

2. A feed distributing mechanism comprising a plurality of horizontally arranged feed troughs, each trough having a flexible strip conveyor positioned to convey feed throughout the length of said trough, each of said conveying flexible strips being continuous, moving along the bottom inside one of said horizontally arranged feed troughs and returning beneath said trough, idler rollers for supporting said flexible strip positioned at intervals beneath each feed trough and each of said troughs connecting at one end to a multi-ingress, said multi-ingress consisting of a plurality of feed compartments receiving feed from openings in the side wall of a conduit common to all said compartments, each of said compartments having an opening in the top to receive feed when discharged from the flexible strip conveyor positioned immediately above, if any, for redistribution in the adjoining feed trough, said compartments also having adjustable closure means to regulate the quantity of feed delivered to said conveying flexible strips, a plurality of gauges for measuring the depth of feed delivered to said flexible strips positioned one to each of said feed compartments, wheels beneath each of said feed compartments in said multi-ingress for winding said flexible strip conveyors, also a multi-egress, positioned at the opposite ends of said horizontally arranged feed troughs, said multi-egress consisting of a conduit to which said plurality of horizontally arranged feed troughs connect, wheels within said multi-egress for winding said conveying flexible strips mounted adjacent to an end of each feeding trough, means for taking up slack in said flexible strips and doors opening into the multi-egress conduit for servicing, gears affixed to said multi-egress flexible strip wheels, one gear each, a vertically positioned drive shaft having gears which mesh one to each flexible strip wheel gear, bearings attached to said multi-egress in which the said vertically positioned drive shaft rotates, a horizontally arranged drive shaft positioned to rotate said vertically positioned drive shaft through suitable gears and means including a motor for rotating said horizontally positioned drive shaft.

3. In a feed supply apparatus for poultry confined in a multi-storied housing, a large feed bunker situated above said multi-storied housing having a conduit extending downward from said bunker, said conduit having a plurality of ducts for conducting mash from said conduit, arranged at storied intervals along its side, an opening in the top of each of said ducts for the purpose of receiving surplus feed discharged from a conveyor belt positioned above, if any, adjustable gates, one for each duct, positioned beneath said ducts, adjustable gates, one for each duct, across the open fronts of said ducts, a plurality of feed troughs arranged at storied intervals positioned one trough adjacent to each of said ducts, belts, one for each duct, for drawing mash from said ducts and distributing it through the length of the troughs, a bead attached, one on each inner side of each trough, extending throughout their length and having a slight clearance above the bottoms of said troughs, a vertically arranged feed chute positioned at the opposite ends of said troughs in which chute the floors of said troughs are received, said feed chute being both a discharge chute and housing for conveyor belt wheels and also a support for belt tightening devices, two conveyor belt wheels to each belt positioned one wheel beneath each of said ducts and one wheel adjacent to an end of a trough in said chute, a belt tightening device to each belt, and driving means for actuating said conveyor belts consisting of beveled gears positioned on the outside wall of said feed chute, a main line shaft positioned horizontally above the end of said multi-storied housing for rotating said driving means, and means for rotating said main line shaft.

4. In a feed distribution mechanism, a feed supply means housing a plurality of belt pulleys positioned one pulley to each trough, a plurality of feed troughs all terminating at one end in said feed supply means, a convex moulding paralleling the bottom of each of said troughs affixed to each of the side walls of said feed troughs having their bottom edges terminating short of flexible strips positioned on the bottoms of said troughs, said plurality of feed troughs arranged one above the other all terminating at their other end in a feed discharge conduit, flexible strips positioned to convey feed into said feed troughs, one to each trough and arranged to return said feed from the feed troughs back into said feed supply means for redistribution in the next trough below, if any, a feed discharge conduit, having rotary means for driving said feed conveyor flexible strips, one to each strip, positioned within said discharge conduit, gear wheels affixed to said rotary means for turning said rotary means, one gear to each rotary means, said gears positioned on the outside wall of said discharge conduit, also a vertically arranged shaft serving as an axis for a plurality of gears meshing one with each of said gear wheels, a horizontally arranged shaft serving as an axis for a driving gear said gear positioned for rotating said vertically arranged shaft also suitable speed reduction means and a motor for rotating said horizontally arranged shaft.

5. An animal feed distribution system comprising, in combination, a plurality of endless belts in tiered troughs, one of said belts being positioned in each of said tiered troughs, a cylinder for winding said belt positioned at each end of said belt, a feed ingress positioned at one end common to all of said tiered troughs, said feed ingress containing those of said cylinders positioned at one end common to all of said tiered troughs and containing tiers of feed cells each positioned adjacent to an end of one of said tiered troughs, said cells having slides each adjustable to a scale, said slides being adjustable across the front opening of said feed cells for regulating the quantity of feed drawn from the cells by said endless belts, said feed cells also having slides movable across their bottom openings, one slide for each bottom opening to support feed contained in said cells above said endless belts when closed and to permit feed to drop onto the belts when open, an opening through the top of each of said feed cells positioned to admit feed cascading down from said endless belt positioned in next tiered trough above, if any, a feed egress positioned at the opposite end, common to all of said tiered troughs, from that occupied by said feed ingress, said feed egress containing such of said cylinders as are positioned at the trough ends occupied by said egress, means for rotating said cylinders positioned adjacent to said egress consisting of gears, shaftings and a motor, a vertical passage inside said egress housing down which feed passes when discharged from any or all of said endless belts in said tiered troughs, belt tension means positioned upon and within said egress housing, means for preventing fowls from raking feed from said troughs into said vertical discharge passage, and pivotable gates positioned in said egress housing at spaced intervals permitting access to cylinders contained therein.

6. In a feed distribution system for poultry batteries having a plurality of horizontally arranged tiers of cages, a plurality of superposed conveyor belts each of which is accessable to a tier of cages, said belts positioned, one parallel to each tier of cages, a plurality of feed troughs positioned, one parallel to each tier of cages in each of which troughs one of said conveyor belts operates, a storied feed ingress consisting of a housing positioned adjacent to an end common to all of said feed troughs having a plurality of compartments arranged vertically, each of said compartments being positioned adjacent to one of said tiers of cages, each compartment receiving feed from a vertical conduit, through an opening adjacent to said compartment in said conduit, each compartment having an adjustable slide across an opening in the bottom positioned to provide clearance above one of said conveyor belts, each compartment having an adjustable slide vertically arranged across a vertical opening in said compartment, said vertical slide being adjustable to a scale for measuring the quantity of feed drawn from said compartment by said conveyor, each compartment having an opening at the top positioned to receive feed cascaded from said conveyor belt positioned beneath the bottom of the next compartment above, if any, from which compartment said feed may be redistributed to said conveyor belt through said slides, said storied feed ingress housing having a plurality of conveyor belt wheels, one positioned beneath each of said compartments, also hand holes in said feed ingress housing positioned two beneath each compartment, adjacent to each conveyor belt wheel, one on each of two sides, a feed egress consisting of a housing having a plurality of conveyor belt wheels arranged vertically, each of said wheels being positioned adjacent to one of said tiers of cages, a plurality of doors in said feed egress, one positioned adjacent to each of said wheels, said feed egress being positioned at the opposite ends of said feed troughs from those occupied by said feed ingress, and means for turning said feed egress conveyor belt wheels comprising gears, drive shafts, a motor and suitable sprocket wheels.

7. In combination, a multi-storied housing consisting of cages for confining poultry and a feed apparatus for poultry confined in said cages including a large feed bunker situated above said multi-storied housing having a conduit extending downward from said bunker, such conduit having a plurality of ducts for conducting mash from said conduit, arranged at storied intervals along its side, an opening in the top of each of said ducts for the purpose of receiving surplus feed discharged from a conveyor belt, if any, positioned above each of said ducts, adjustable gates positioned beneath said ducts, adjustable gates positioned across the open fronts of said ducts, wheels for turning conveyor belts positioned one beneath each of said ducts, conveyor belts, one to each trough, for drawing mash from said ducts and distributing it throughout the length of troughs, a plurality of troughs extending horizontally one below the other along the entire front of said multi-storied housing, a beading attached one to each of the inner sides of said troughs extending throughout their length and having a slight clearance above the bottoms of said troughs, a vertically arranged feed chute at the opposite end of said troughs, in which chute the floors of said troughs are received, conveyor belt wheels positioned in said feed chute, one adjacent to each trough end, bearings for supporting each of said wheels affixed to each wall of said chute, belt tightening rollers attached to said chute positioned one beneath each of said troughs, also idler rollers for supporting said belts, driving means for actuating said conveyor belts consisting of gears positioned on the outside wall of said chute and a main line shaft with gears positioned horizontally above said feed chute, and a motor and suitable speed reduction means for rotating said main line shaft.

HAROLD PARK HAGGART.